(12) United States Patent
Gill et al.

(10) Patent No.: US 7,574,556 B2
(45) Date of Patent: Aug. 11, 2009

(54) WISE ORDERING FOR WRITES—COMBINING SPATIAL AND TEMPORAL LOCALITY IN WRITE CACHES

(75) Inventors: Binny Sher Gill, Auburn, MA (US); Dharmendra Shantilal Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/384,939

(22) Filed: Mar. 20, 2006

(65) Prior Publication Data
US 2007/0220201 A1 Sep. 20, 2007

(51) Int. Cl.
*G06F 12/00* (2006.01)
(52) U.S. Cl. .................. 711/113; 711/130; 711/114
(58) Field of Classification Search ............... 711/4, 711/113–114, 118, 130, 141–144
See application file for complete search history.

(56) References Cited

U.S. PATENT DOCUMENTS

| | | | |
|---|---|---|---|
| 5,313,609 A | 5/1994 | Baylor et al. |
| 5,434,992 A | 7/1995 | Mattson |
| 5,542,066 A | 7/1996 | Mattson et al. |
| 5,754,888 A | 5/1998 | Yang et al. |
| 6,272,662 B1 | 8/2001 | Jadav et al. |
| 6,341,331 B1 | 1/2002 | McNutt |
| 6,493,800 B1 | 12/2002 | Blumrich |
| 6,785,771 B2 | 8/2004 | Ash et al. |
| 6,865,647 B2 | 3/2005 | Olarig et al. |
| 6,865,648 B1 | 3/2005 | Naamad et al. |
| 6,898,672 B2 | 5/2005 | Lambright et al. |
| 2004/0078518 A1 | 4/2004 | Kuwata |
| 2005/0010722 A1 | 1/2005 | Chen |
| 2007/0220200 A1 | 9/2007 | Gill |

FOREIGN PATENT DOCUMENTS

JP 2001249835 A 9/2002

OTHER PUBLICATIONS

Lee, Jung-Hoon et al., Application-adaptive intelligent cache memory system, ACM Transactions on Embedded Computing Systems (TECS), ACM Transactions on Embedded Computing Systems (TECS), vol. 1, Issue 1 (Nov. 2002), pp. 56-78.

(Continued)

*Primary Examiner*—Jasmine Song
(74) *Attorney, Agent, or Firm*—Jeffrey P. Aiello; Anthony V. S. England

(57) ABSTRACT

A storage system has a storage controller for an array of storage disks, the array being ordered in an sequence of write groups. A write cache is shared by the disks. The storage controller temporarily stores write groups in the write cache, responsive to write groups being written, and lists the write groups in order of their sequence in the array and in circular fashion, so that a lowest is listed next to a highest one of the write groups. The storage controller selects the listed write groups in rotating sequence. Such a write group is destaged from the write cache to the disk responsive to i) the selecting of the write group and ii) a state of a recency indicator for the write group, wherein the recency indicator shows recency of writing to the write group.

27 Claims, 4 Drawing Sheets

OTHER PUBLICATIONS

Panda, P.R. et al., Data and memory optimization techniques for embedded systems, ACM Transactions on Design Automation of Electronic Systems (TODAES), vol. 6, Issue 2 (Apr. 2001), pp. 149-206.

Song, Yonghong et al., "Data Locality Enhancement by Memory Reduction," Proceedings of the 15th international conference on Supercomputing, Jun. 16-21, 2001, Sorrento, Italy, pp. 50-64, http://www.cs.purdue.edu/homes/li/draft/ics01.pdf.

Lee, Jung-Hoon et al., "Application-adaptive intelligent cache memory system," ACM Transactions on Embedded Computing Systems (TECS), ACM Transactions on Embedded Computing Systems (TECS), vol. 1, Issue 1 (Nov. 2002), pp. 56-78, http://wotan.liu.edu/docis/lib/sisl/rclis/dbl/atemcs/(2002)1%253A1%253C56%253AAICMS%253E/supercom.yonsei.ac.kr%252Fpaper%252FACM-format-final.pdf.

Sermulins, Janis et al., "Cache Aware Optimization of Stream Programs," Proceedings of the 2005 ACM SIGPLAN/SIGBED conference on Languages, compilers, and tools for embedded systems, Jun. 15-27, 2005, Chicago, vol. 40 Issue 7, pp. 115-126, http://web.mit.edu/rabbah/www/docs/sermulins-lctes-2005.pdf.

Panda, P.R. et al., "Data and memory optimization techniques for embedded systems," ACM Transactions on Design Automation of Electronic Systems (TODAES), vol. 6, Issue 2 (Apr. 2001), pp. 149-206, http://www.ee.ucla.edu/~ingrid/Courses/Reading/p149-pandaACM2001.pdf.

Marathe, Jaydeep et al., "METRIC: tracking down inefficiencies in the memory hierarchy via binary rewriting," Performance monitoring session, ACM International Conference Proceeding Series, vol. 37, Proceedings of the international symposium on Code generation and optimization: feedback-directed and runtime optimization, Mar. 23-26, 2003, pp. 289-300, http://www.csl.cornell.edu/~sam/papers/cgo03.pdf.

US 7,574,556 B2

WISE ORDERING FOR WRITES—COMBINING SPATIAL AND TEMPORAL LOCALITY IN WRITE CACHES

CROSS-REFERENCE

This application is related to U.S. patent application Ser. No. 11/384,890, Wise Ordering For Writes—Combining Spatial and Temporal Locality in Write Caches For Multi-Rank Storage, which is filed on the same date as the present application, and the related application is hereby incorporated herein by reference.

BACKGROUND

1. Field of the Invention

The present invention concerns caching in computer systems and, more particularly, concerns write caching for disk storage devices.

2. Related Art

Processor speeds have grown about sixty percent per year, while electromechanical disk storage devices have improved their access times at a comparatively meager annual rate of about eight percent. At the same time, capacity of disk storage devices has grown more than fifty percent per year, which tends to reduce the amount of data available by parallel, concurrent disk access. By themselves, these trends would dictate that a processor must wait longer for disk read and write operations. Consequently, huge efforts have gone into hiding latency for disk bound computer applications.

A cache has been described by the Storage Networking Industry Association as "A high speed memory or storage device used to reduce the effective time required to read data from or write data to a lower speed memory or device." Caching is a fundamental technique in hiding I/O latency and is widely used in storage controllers, databases, file systems, and operating systems. A modern storage controller's cache typically contains volatile memory used as a read cache and a non-volatile memory used as a write cache. Non-volatile storage ("NVS"), which is typically fast, but relatively expensive, random access memory, enables writes to be stored quickly and safely in an NVS write cache and destaged, i.e., written to disk storage, later in an asynchronous fashion, which hides the latency of writing to the disk storage, which is slower, but relatively less expensive than the NVS write cache. Read cache management is a well studied discipline and there are a large number of cache replacement algorithms in this context. In contrast, write caching is a relatively less developed subject.

In destaging, a balance must be obtained. Data in the write cache must be destaged quickly enough so that there is always space for incoming writes, but not so quickly that the benefit of the write cache is under utilized. This balance has been addressed, for example, by linear threshold scheduling, in which the rate of destaging is varied in response to instantaneous occupancy of the write cache. It has also been addressed by scheduling using least-cost and high/low "water" marks.

Another issue presented in destaging concerns the destaging order. As long as the write cache is drained fast enough, the precise order in which data is destaged does not affect performance from the standpoint of fairness or of write requests becoming starved because write requests are considered complete, in most respects, once they are written to the write cache. However, destage ordering can crucially affect peak write throughput and performance of concurrent reads. Peak write throughput is affected by destage ordering because the capacity of disks to physically support sequential or nearly sequential write traffic is significantly higher than their capacity to support random writes. That is, destaging writes in an order that exploits this physical fact can significantly improve peak write throughput. This was a fundamental motivation for development of log-structured file systems in a different context. Performance of concurrent reads is affected by destage ordering because to the extent destage ordering improves write performance, it improves read performance. That is, with concurrent reads and writes, the less time spent writing to a disk, the more time there is available to read from the disk.

As may be seen from this brief background, problems are presented in balancing tradeoffs involved in write caching. Problems are presented even regarding how to frame all the issues regarding write caching and in recognizing resultant interactions among the issues.

SUMMARY OF THE INVENTION

The present invention addresses the foregoing problem. According to one form of the invention, in a storage system having an array of storage disks, the array is ordered in an sequence of write groups and a write cache is shared by the disks. A method of destaging the write cache includes placing ones of the write groups in the write cache temporarily, responsive to the ones of the write groups being written to the array. The write groups stored in the write cache are listed in order of the sequence in the array. The listing is circular, so that a lowest one of the write groups is listed next to a highest one of the write groups. The listed write groups are selected in rotation according to the sequence. Such a listed write group is destaged from the write cache to the disk responsive to the selecting of the write group and a state of a recency indicator for the write group. The recency indicator shows recency of writing to the write group.

In another aspect, such a recency indicator includes a bit having one state indicating the write group has been written to recently and another state indicating the write group has not been written to recently.

In another aspect, the method includes setting such a recency indicator for such a write group responsive to placing the write group in the write cache.

In another aspect, the method includes clearing the state of such a recency indicator responsive to the selecting of the indicator's respective write group, and wherein the destaging of a write group responsive to the write group's recency indicator includes destaging responsive to the indicator being cleared.

In another aspect, the destaging of such write groups includes issuing numerous, concurrent destaging write request to ones of the disks, and the method includes varying the concurrent write requests in number responsive to space in the shared write cache.

In another aspect, varying the concurrent write requests includes issuing concurrent destaging write requests at a certain predetermined maximum rate responsive to write cache space exceeding the certain high threshold.

In another aspect, varying the concurrent write requests includes increasing the number of concurrent destaging write requests responsive to decreasing space in the write cache if the write cache space is within a range between a certain high threshold and a certain low threshold.

In another aspect, varying the concurrent write requests includes issuing concurrent destaging write requests at a certain predetermined minimum rate responsive to write cache space falling below the low threshold for a write group that is a member of a sequence of write groups in the write cache, if a next listed write group for destaging is also a member of a sequence of write groups.

In another aspect, varying the concurrent destaging write requests includes issuing no write requests responsive to the write cache space falling below the low threshold for a write group that is not a member of a sequence of write groups in the write cache.

In another form of the invention, a computer program product resides on a computer usable medium having computer readable program code. The program code includes instructions for placing ones of the write groups in the write cache temporarily, responsive to the ones of the write groups being written to the array. The program code further includes instructions for listing the write groups stored in the write cache in order of the sequence in the array, wherein the listing is circular, so that a lowest one of the write groups is listed next to a highest one of the write groups. The program code further includes instructions for selecting the listed write groups in rotation according to the sequence. The program code further includes instructions for destaging such a listed write group from the write cache to the disk responsive to i) the selecting of the write group and ii) a state of a recency indicator for the write group, wherein the recency indicator shows recency of writing to the write group.

In another aspect, the program code includes instructions for setting such a recency indicator for such a write group responsive to placing the write group in the write cache.

In another aspect, the program code includes instructions for clearing the state of such a recency indicator responsive to the selecting of the indicator's respective write group, and the instructions for destaging of a write group responsive to the write group's recency indicator include instructions for destaging responsive to the indicator being cleared.

In another aspect, the program code includes instructions for destaging of such write groups include instructions for issuing numerous, concurrent destaging write request to ones of the disks, and the program code includes instructions for varying the concurrent write requests in number responsive to space in the shared write cache.

In another aspect, the instructions for varying the concurrent write requests include instructions for issuing concurrent destaging write requests at a certain predetermined maximum rate responsive to write cache space exceeding the certain high threshold.

In another aspect, the instructions for varying the concurrent write requests include instructions for increasing the number of concurrent destaging write requests responsive to decreasing space in the write cache if the write cache space is within a range between a certain high threshold and a certain low threshold.

In another aspect, the instructions for varying the concurrent write requests include instructions for issuing concurrent destaging write requests at a certain predetermined minimum rate responsive to write cache space falling below the low threshold for a write group that is a member of a sequence of write groups in the write cache, if a next listed write group for destaging is also a member of a sequence of write groups.

In another aspect, the instructions for varying the concurrent destaging write requests include instructions for issuing no write requests responsive to the write cache space falling below the low threshold for a write group that is not a member of a sequence of write groups in the write cache.

In another form of the invention, a storage system has a storage controller and a write cache that is shared by an array of storage disks. The array is ordered in an sequence of write groups. The storage controller includes storing logic for placing ones of the write groups in the write cache temporarily, responsive to the ones of the write groups being written to the array. The storage controller also includes listing logic for listing the write groups stored in the write cache in order of their sequence in the array, wherein the listing is circular, so that a lowest one of the write groups is listed next to a highest one of the write groups. The storage controller also includes selecting logic for selecting the listed write groups in rotation according to the sequence. The storage controller also includes destaging logic for destaging such a listed write group from the write cache to the disk responsive to i) the selecting of the write group and ii) a state of a recency indicator for the write group, wherein the recency indicator shows recency of writing to the write group.

In another aspect of the storage system, such a recency indicator includes a bit having one state indicating the write group has been written to recently and another state indicating the write group has not been written to recently.

In another aspect, the storage system includes recency logic for setting such a recency indicator for such a write group responsive to placing the write group in the write cache.

In another aspect, the recency logic includes logic for clearing the state of such a recency indicator responsive to the selecting of the indicator's respective write group, and wherein the destaging logic includes logic for destaging responsive to the indicator being cleared.

In another aspect, the destaging logic includes logic for issuing numerous, concurrent destaging write request to ones of the disks, and the system includes logic for varying the concurrent write requests in number responsive to space in the shared write cache.

In another aspect, the logic for varying the concurrent write requests includes logic for issuing concurrent destaging write requests at a certain predetermined maximum rate responsive to write cache space exceeding the certain high threshold.

In another aspect, the logic for varying the concurrent write requests includes logic for increasing the number of concurrent destaging write requests responsive to decreasing space in the write cache if the write cache space is within a range between a certain high threshold and a certain low threshold.

In another aspect, the logic for varying the concurrent write requests includes logic for issuing concurrent destaging write requests at a certain predetermined minimum rate responsive to write cache space falling below the low threshold for a write group that is a member of a sequence of write groups in the write cache, if a next listed write group for destaging is also a member of a sequence of write groups.

In another aspect, the logic for varying the concurrent destaging write requests includes logic for issuing no write requests responsive to the write cache space falling below the low threshold for a write group that is not a member of a sequence of write groups in the write cache.

Other variations, objects, advantages, and forms of the invention will become apparent upon reading the following detailed description and upon reference to the accompanying drawings.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

Figure 1:
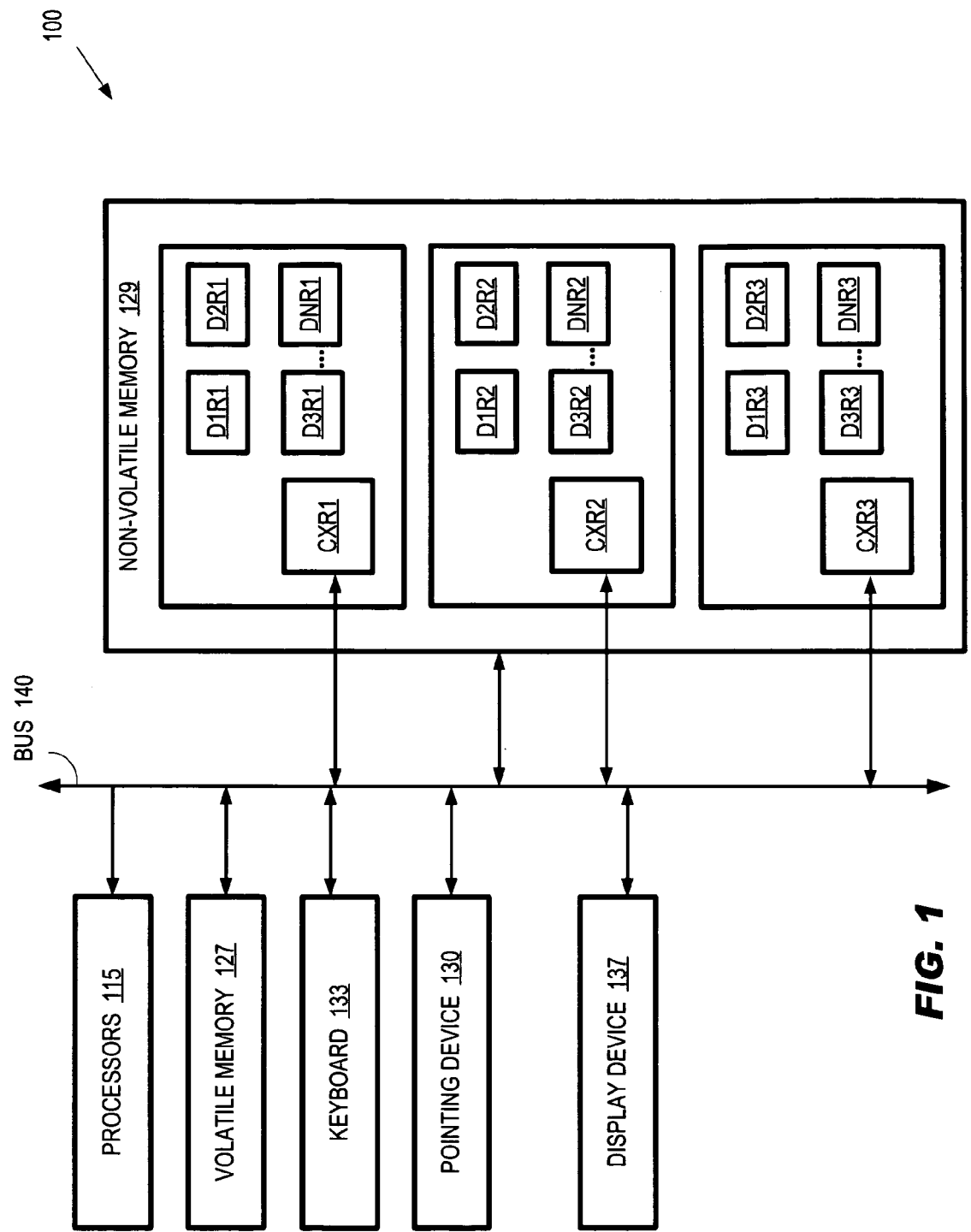
FIG. 1 illustrates a storage system, according to an embodiment of the present invention.

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

Overview

There are numerous incentives to improving write cache destaging performance, and, hence, overall write performance, which also leads to improved read performance, as previously stated. For one thing, the widely used redundant array of independent disks ("RAID") technology tends to make writes slower than reads. Also, write caches are commonly smaller than read caches. Further, client side caching does not significantly benefit write operations as it does read operations. Also, the proportion of write operations in the widely used storage benchmark SPC-1 is larger than the proportion of read operations.

The present invention involves a recognition that write destaging performance depends upon a combination of factors, including (i) the total number of destages to disks, namely, the write miss ratio, and (ii) the average cost of each destage. In the absence of any read operations, it is important for a write destage algorithm to minimize the product of these factors. Even in the presence of concurrent reads, the product of these factors tends to minimize the amount of time that the disk heads are occupied in serving writes, which tends to minimize the average read response time and maximize aggregate throughput.

To minimize the first factor, the present invention seeks to exploit temporal locality, which may favor destaging segments of data least likely to be written to while in the write cache, and thus most likely to ultimately be destaged. Classically, a least recently used ("LRU") policy has been used to exploit temporal locality in read caches. In write caches this translates to a least recently written ("LRW") policy. Other policies that have been used in read caches for exploiting temporal locality include CLOCK, FBR, LRU-2, 2Q, LRFU, LIRS, MQ, ARC and CAR, all of which attempt to reduce the miss ratio in a read cache.

To minimize the second factor, the present invention seeks to exploit spatial locality, which may favor destaging segments of data located closest together on the disks, and thus subject to the fastest write operation, according to the heads and the geometry of the disks in the system. A number of algorithms are known for exploiting spatial locality, including those which seek to serve I/O's on a first-come-first-serve ("FCFS") basis, a shortest-seek-time-first ("SSTF") basis, a shortest access time first ("SATF") basis, and on the basis that I/O's are served first in increasing order and then in decreasing order of their logical addresses ("SCAN"). There are many other variants known as LOOK, VSCAN, FSCAN, Shortest Positioning Time First ("SPTF"), GSTF and WSTF, and largest segment per track ("LST").

These known algorithms that are advantageous regarding spatial locality may depend upon a detailed knowledge of instantaneous position of a disk head and the location of each data segment relative to the disk head, particularly for read operations. However, the present invention is in the context of a storage controller at a level in a memory hierarchy that is somewhat removed from the actual disks themselves. Further, it is for write operations instead of read operations. In this context, most disk parameters are hidden, due to RAID, for example, so that spatial locality is generally hard to exploit. For example, it has been found that applying SATF at a high level in the memory hierarchy such as that of a storage controller was not practical. See L. Huang et al., Experience in Building a Software Based SATF Scheduler," Tech. Rep. ECSL-TR81, SUNY at Stony Brook (July 2001) (" . . . modern disks have too many internal control mechanisms that are too complicated to properly account for in the disk service time model. This exercise lead us to conclude that software-based SATF disk schedulers are less and less feasible as the disk technology evolves."), also ("Even when a reasonably accurate software based SATF disk scheduler can be successfully built, the performance gain over a SCAN based disk scheduler that it can realistically achieve appears to be insignificant . . . "). This conclusion regarding SATF was for mere single disk applications. For applications having an array of redundant disks, as in the context of the present invention, the conclusion is all the more certain. Previous work has attempted to apply principles of both spatial and temporal locality to the problem of write cache control by partitioning the write cache into a "hot" zone managed according to an LRW policy and a "cold" zone managed via an LST policy. However, this work only deals with interaction between the cache and one disk. T. R. Haining, "Non-volatile Cache Management for Improving Write Response Time with Rotating Magnetic Media," 126, Ph.D. Thesis, Ph.D. Dissertation, University of California, Santa Cruz (2000). Also, even with regard to a single disk, further work is needed to develop an adaptive algorithm for tuning the size of the hot zone. See id., 125 ("One of the most immediate aspects of this work requiring more research is the method to determine the size of the hot zone for the stack model based replacement algorithm. We determined the best size for the hot zone empirically in our experiments."). The work does not fully address how to determine the best adaptive partition. In addition, the hot zone optimizes for temporal locality, whereas the cold zone for spatial locality.

In seeking to apply principles of both spatial and temporal locality for write cache control in the context of a storage controller, i.e., in upper levels of memory hierarchy, the present invention applies processes related to LRW for temporal locality and CSCAN for spatial locality. In CSCAN, I/O's are served only in increasing order of their logical addresses. A difficulty arises because the order of destaging that is suggested by LRW tends to be different than that of CSCAN. This difficulty is addressed in the present invention by a novel combination, referred to herein as Wise Ordering for Writes ("WOW"), wherein write groups in the write cache are maintained in a CSCAN-like arrangement, but with recency bits akin to those of CLOCK. (For details of CLOCK, see F. J. Corbato, "A paging experiment with the multics system," In Honor of P. M. Morse, pp. 217-228, MIP Press, 1969.) Destaging is skipped for write groups to which data has been recently written, as indicated by the recency bits.

Described another way, the present invention frames the destaging problem as interrelated issues concerning what write data to destage and when to destage the selected write data. According to the present invention, the issues are defined and addressed by a novel combination of a particular kind of adaptive water mark and a particular kind of linear threshold scheduling.

Example of Destaging Context

Referring now to FIG. 1, a storage system 100 is shown according to an embodiment of the present invention. System 100 takes the form of a computer system. It should be understood that the term "computer system" is intended to encompass any device having a processor that executes instructions from a memory medium, regardless of whether referred to in terms of a microcontroller, personal computer system, mainframe computer system, workstation, server, or in some other terminology. Computer system 100 includes processors 115, a volatile memory 127, e.g., RAM and a nonvolatile memory 129. Memories 127 and 129 store program instructions (also known as a "software program"), which are executable by processors 115, to implement various embodiments of a software program in accordance with the present invention. Processor 115 and memories 127 and 129 are interconnected by bus 140. An input/output adapter (not shown) is also connected to bus 140 to enable information exchange between processors 115 and other devices or circuitry. System 100 also includes a keyboard 133, pointing device 130, e.g., mouse, floppy disk, CD-ROM, and DVD, and a display device 137.

In the illustrated embodiment, system 100 is an IBM xSeries 345 computer equipped with two Intel Xeon 2 GHz processors 115. In the illustrated embodiment, nonvolatile memory 129 includes 10K RPM, SCSI, DDR disks D1R1 through DNR1, D1R2 through DNR2, and D1R3 through DNR3, each disk being 36.4 GB each. The number of ranks and number of disks N in each rank may vary in different embodiments, of course.

Nonvolatile memory 129 also includes another disk (not shown) that is used for an operating system, software applications, and workloads. In other embodiments the operating system may be on multiple disks or on some other nonvolatile store, not necessarily a disk. In another embodiment the operating system may even be programmed in specialized chip hardware. A Linux kernel runs on system 100 for hosting the applications and standard workload generators. Memory 129 also includes ROM, which is not shown, and may include other devices, which are also not shown, such as floppy disks, CD-ROMs, and DVDs.

Figure 2:
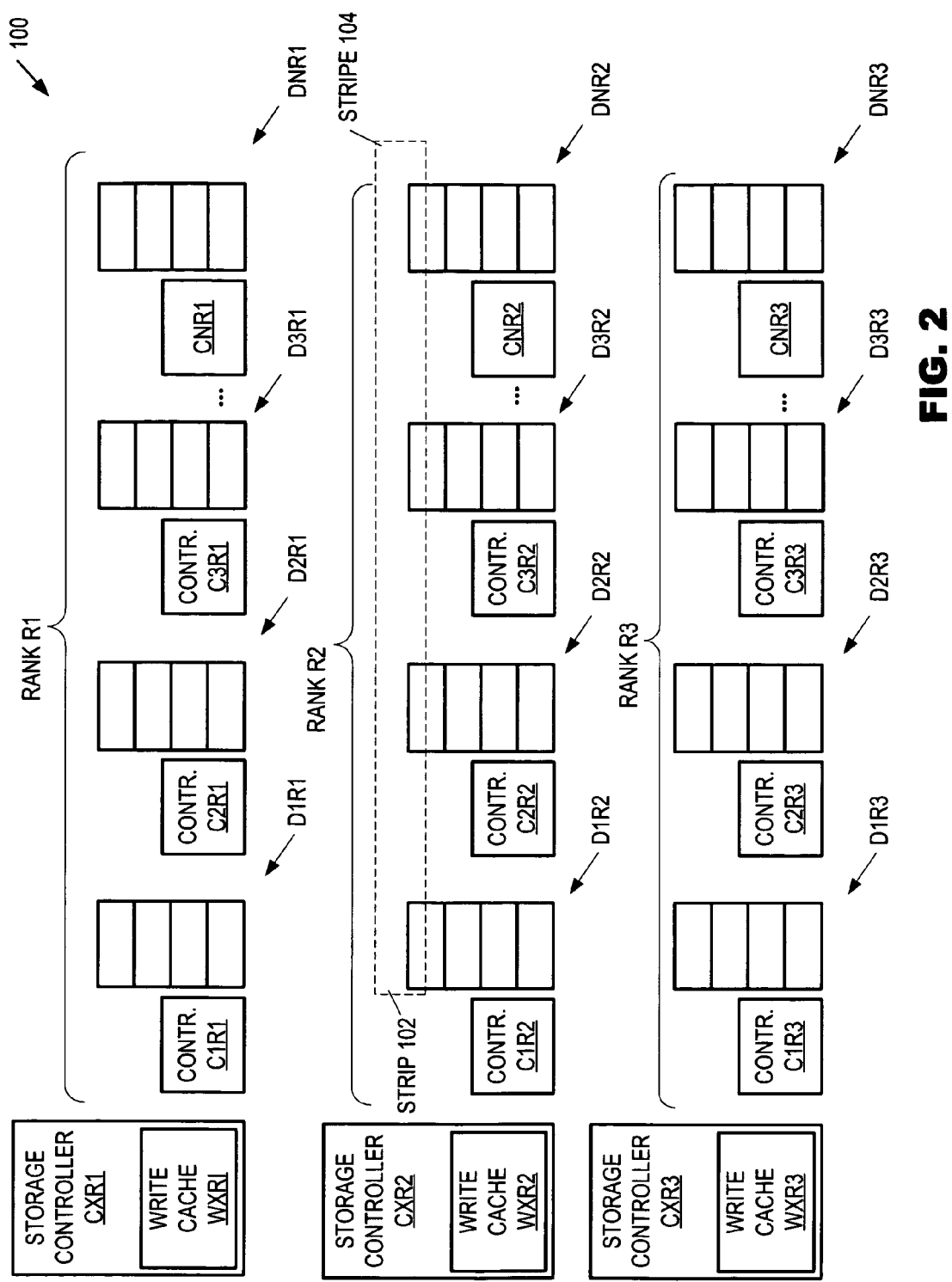
FIG. 2 illustrates certain details of the storage system of FIG. 1, according to an embodiment of the present invention.

Referring now to FIG. 2, certain details of system 100 are illustrated according to an embodiment of the invention. SCSI disks, D1R1, etc., are configured as three RAID-10 arrays R1, R2, and R3, each having a respective set of data disks, each set being N in number. For example, array R1 has data disks D1R1, D2R1, D3R1, etc. through DNR1. Arrays R1, R2 and R3 have respective RAID storage controllers CXR1, CXR2 and CXR3, each for controlling its respective set of the RAID-configured disks. Each disk has its own disk controller. For example, disk D1R1 has its own disk controller C1 R1, as shown.

In a RAID-10 implementation illustrated in FIG. 2, storage controllers CXR1, CXR2 and CXR3 have respective write caches WXR1, WXR2 and WXR3, which are managed in terms of 64 KB strip 102 write groups. Strip 102 size may vary, of course. Write cache WXR1 is shared by the disks D1R1, etc. of array R1, WXR2 is shared by the disks D1R2, etc. of array R2 and WXR3 is shared by the disks D1R3, etc. of array R3.

In an alternative embodiment of the invention, disks D1R1-DNR1, D1R2-DNR2 and D1R3-DNR3 are configured as RAID-5 arrays. For the RAID-5 implementation, write caches WXR1, WXR2, and WXR3 are managed in terms of stripe 104 write groups. In one embodiment, strip 102 size (chunk size) for each disk D1R1, etc. is 64 KB, which results in a stripe 104 group size of 64 KB×N. Strip 102 and stripe 104 group sizes may vary, of course.

In still another embodiment of the invention, SCSI disks D1R1-DNR3 are configured merely as non-redundant disks. In an individual disk embodiment of the invention, single disks are managed in units of 4 KB pages, for example.

Figure 3:
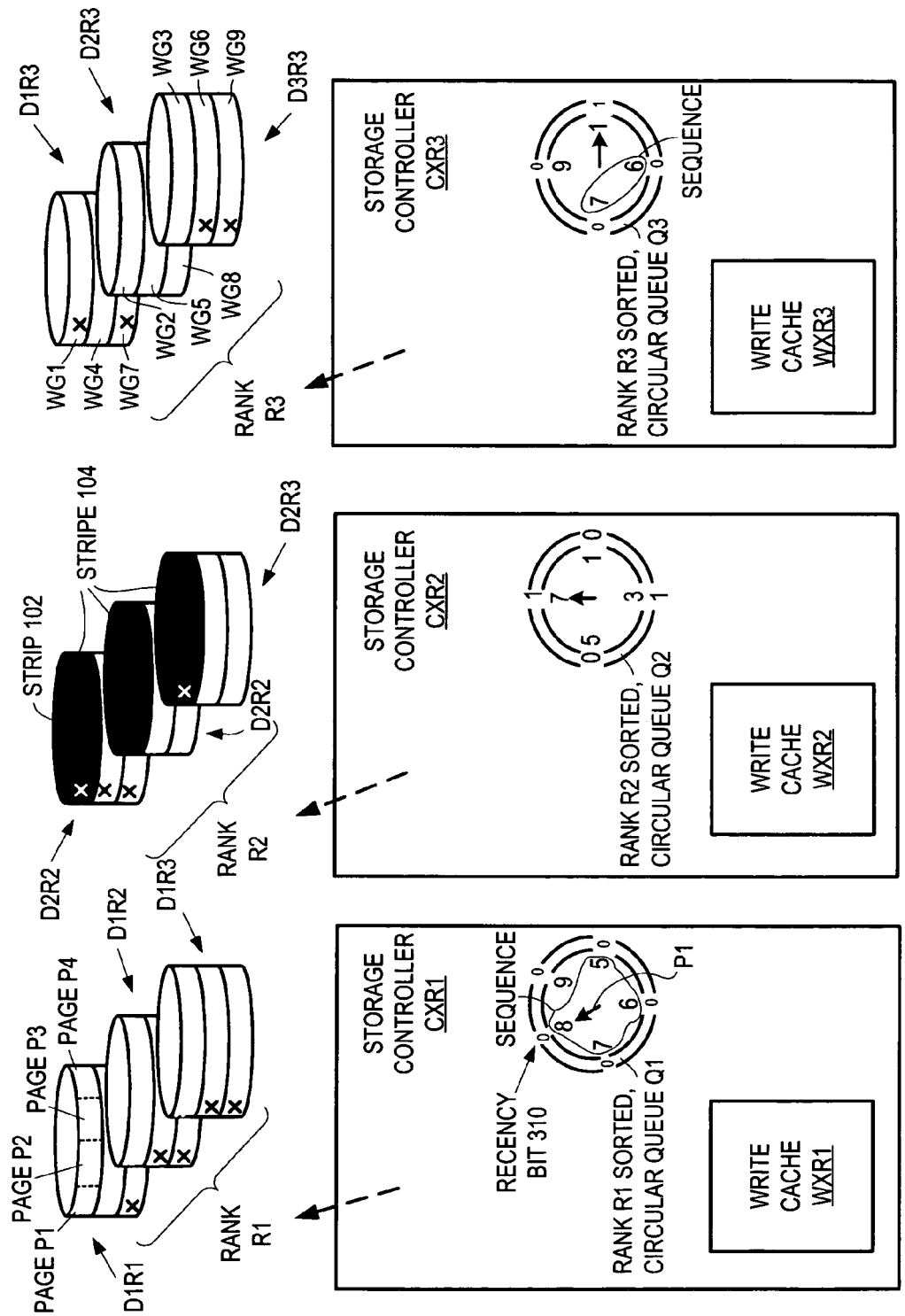
FIG. 3 illustrates certain additional details of the storage system of FIGS. 1-2, according to an embodiment of the present invention.

Referring now to FIG. 3, additional details are illustrated for an embodiment of the invention. In FIG. 3, a RAID-10 implementation is illustrated, in which storage controllers CXR1, CXR2 and CXR3 have respective write caches WXR1, WXR2 and WXR3, which are managed in terms of 64 KB strip 102 write groups, as in FIG. 2. (For simplicity of explanation each rank R1, etc. is shown with just three data disks D1R1, D2R1, D3R1, etc. It should be understood that each rank R1, etc. actually has at least one additional disk not shown, so that each rank has an even number of data disks. It should also be understood that in an embodiment of the invention a RAID-10 rank might even have merely two disks.)

Each disk D1R1, etc. is divided into strips 102, where each strip 102 is a logically and physically contiguous set of pages. Pages P1, P2, P3 and P4 are explicitly shown for one of the strips 102, although it should be understood that the pages P1, P2, etc. exist for all such strips 102. In the illustrated embodiment of the invention, the smallest unit of cache management is a 4 KB page, e.g., page P1, P2, etc. As shown in FIGS. 2 and 3, a stripe 204 is a collection of strips 202. In the illustrated embodiment, the size of each strip 102 is 64 KB and each participating disk D1R1, etc. contributes one strip 102 to a stripe 104. (Note that the embodiment illustrated shows only four stripes 102 per disk D1R1, etc. It should be understood that this is merely to simplify the illustration, e.g., to make it easier to follow, and that in an actual implementation, disks D1R1, etc. conventionally have many more strips 102. Note also, due to mirroring in RAID-10 and parity in RAID-S, the effective storage provided by a stripe 104 is less than its physical size.)

In a RAID-10 embodiment of the invention, as illustrated in FIG. 3 and described herein, storage controllers CXR1, etc. manage their respective write caches WXR1, etc. in terms of strips 102. Thus, in this particular description, a write group WG1, WG2, etc. is a strip 102. However, it should be understood that in other embodiments of the invention, a write group WG1, etc. may refer to some other memory segment, such as a page P1, P2, etc. or a stripe 104, for example. In a RAID-5 embodiment of the invention, storage controllers CXR1, etc. manage write caches WXR1, etc. in terms of stripes 104.

In FIG. 3, only nine write groups are shown. Again, this is for simplicity of illustration. It should be understood, however, that the at least one additional disk not shown per rank in the present embodiment may also have write groups that are not shown in FIG. 3, and that this would affect the sequence of write groups.

Referring to array R1, for example, in the illustrated embodiment of the present invention shown in FIGS. 2 and 3, a RAID storage controller CXR1 controls its set of RAID-configured disks D1R1-DNR1, whereas disks D1R1, etc. have their own respective disk controllers C1R1, etc., as previously mentioned. However, write cache WXR1 is the only write cache for the entire array of disks D1R1-D4R1 having a battery back up that can support a fast write. No such fast write cache exists at lower levels, such as at the level of an individual disk controller C1R1, etc. Correspondingly, I/O scheduling in the embodiment of the present invention primarily concerns destaging write requests issued by storage controller CXR1, etc.

While a typical RAID controller, such as controller CXR1, may commonly implement a scheduling algorithm, and an individual disk controller, such as disk controller C1R1, may implement another, smarter disk scheduling algorithm, these smarter, disk-level scheduling concepts are not directly transferable to apply to a storage controller CXR1, for example, at its high level in memory hierarchy, as in the case of the present embodiment of the invention. Also, commonly implemented scheduling algorithms for conventional write caches in individual disk controllers are not directly transferable for application to storage controllers such as CXR1, etc. in the present invention, for example, because the write cache for an individual disk controller is smaller than is write cache WXR1 for storage controller CXR1, even if the conventional disk write cache is compared merely to the amount of memory per disk in write cache WXR1.

The notion of a hit is more straightforward in read caching than write caching. In write caching, a hit can be a hit on a page, a strip, or a stripe. These different hits may have different payoffs. For example, in RAID-S a page hit saves four seeks, whereas a stripe hit that is a page miss saves two seeks because of shared parity.

Arbitrary subsets of pages P1, P2, etc. in a write group WG1, etc. may be present in write cache WXR1, etc. Write requests that access consecutively numbered write groups WG1, WG2, etc. are termed sequential. On a write request for one of the controllers, for example controller CXR1, if all pages to which the request seeks to write are found in write cache WXR1, it is deemed a write hit, and the write request is served immediately. If some of the written pages are not in the write cache WXR1 but enough free page space is available, once again, the write request is served immediately. If, however, some of the written pages are not in the write cache WXR1 and enough free page space is not available, the write request must wait until enough page space become available. In the first two cases, the write response time is negligible. In the last case, the write response time tends to become significant. Thus, write cache WXR1 must be drained so as to avoid this situation if possible.

Selecting What to Destage

Continuing to refer to FIG. 3, according to processes of the present invention, write cache controllers CXR1, CXR2, and CXR3 maintain respective, sorted, circular lists Q1, Q2 and Q3 of the ones of the write groups WG1, WG2, etc. that are in their respective write caches WXR1, WXR2, and WXR3. The "sorted" aspect of lists Q1, etc. refers to the following. The storage space on array R1 of disks D1R1, etc., for example, is arranged in an ordered sequence of write groups WG1, etc. that spans the entire array R1, as shown. Indicia of the ones of the write groups WG1, etc. that are in write cache WXR1 for array R1, are included in list Q1 for cache WXR1 sorted in order of their sequence in the array R1. The "circular" aspect of lists Q1, etc. refers to an aspect of such a list wherein the lowest and the highest write groups in the list are adjacent. In the illustrated example, storage controller CXR1 for rank R1 has write groups WG5, WG6, WG7, WG8 and WG9 in write cache WXR1. Accordingly, list Q1 has indicia for write groups WG5-WG9 in sorted, circular order, as shown ("WG" prefixes omitted due to space limitations), wherein the lowest write group in the sequence, write group WG5, is next to the highest write group in the sequence, write group WG9. Similarly, storage controller CXR2 for rank R2 has write groups WG1, WG3, WG5, and WG7 in write cache WXR2, with write group WG1 next to write group WG7. Accordingly, list Q2 has indicia for write groups WG1, WG3, WG5, and WG7 in sorted, circular order, as shown. Similarly, storage controller CXR3 for rank R3 has write groups WG1, WG6, WG7, and WG9 in write cache WXR3. Accordingly, list Q3 has indicia for write groups WG1, WG6, WG7, and WG9 in sorted, circular order, as shown.

In addition, a "recency" bit 310 is maintained with each write group in the respective lists Q1, Q2 and Q3, as follows. When a write group such as write group WG7 is added to write cache WXR2, for example, indicia for write group WG7 is inserted in its correct sorted position in list Q2. Upon insertion, recency bit 310 for write group WG7 is set to zero, as shown. However, if another write occurs to the same write group WG7 while write group WG7 is in cache WXR2, i.e., if there is a write hit, the recency bit 310 of write group WG7 is set to one, as in the illustrated instance of FIG. 3.

Destaging proceeds as in CSCAN, wherein a destage pointer P1 traverses circular list Q1, pointer P2 traverses circular list Q2, and pointer P3 traverses circular list Q3, selecting write groups for destaging. For a straight CSCAN algorithm, controller CXR2, for example, would destage every write group that is encountered by pointer P2 as pointer P2 traverses list Q2, i.e., write groups WG1, WG3, WG4, and WG7. However, according to the WOW algorithm of the present invention, controller CXR2 only destages a write group having a recency bit 310 of zero, such as write groups WG1 and WG4 in the illustrated instance. That is, write groups such as write groups WG3 and WG7 with recency bits of one are skipped, but the recency bit 310 of such a skipped write group is reset to zero. This gives extra life to a write group that has been hit since the last time a destage pointer pointed to it. This incorporates recency, which relates to temporal locality, and also incorporates small average distance between consecutive destages, which relates to spatial locality.

The following table sets out psuedo-code for certain caching and destaging aspects of a WOW process, according to an embodiment of the present invention:

TABLE ONE

CACHE MANAGEMENT POLICY:
Page x in write group s is written:

1: if (s is in NVS) // a write group hit
2: if (the access is not sequential)
3: set the recencyBit of s to 1
4: endif
5: if (x is in NVS) // a page hit
6: set the recencyBit of s to 1
7: else
8: allocate x from FreePageQueue
and insert x in s
9: endif
10: else
11: allocate s from
FreeStripeGroupHeaderQueue
12: allocate x from FreePageQueue
13: insert x into s and s into the sorted
queue
14: initialize the recencyBit of s to 0
15: if (s is the only write group in NVS)
16: initialize the destagePointer to point to s
17: endif
18: endif

DESTAGE POLICY:

19: while (needToDestage( ))
20: while (the recencyBit of the write group
pointed to by the destagePointer is 1)

TABLE ONE-continued

```
21: reset the recencyBit to 0
22: AdvanceDestagePointer( )
23: endwhile
24: destage all pages in the write group pointed
    to by the destagePointer and
    move them to FreePageQueue
25: move the destaged write group to
    FreeStripeGroupHeaderQueue
26: AdvanceDestagePointer( )
27: endwhile
28: AdvanceDestagePointer( )
29: if (destagePointer is pointing to the
    highest address write group in the queue)
30: reset the destagePointer to point to the
    lowest address write group in the queue
31: else
32: advance the destagePointer to the next
    higher address write group in the queue
33: endif
```

Exception for Sequences

In response to detecting that a number of write groups in an uninterrupted sequence are being added to a write cache, a storage controller overrides the usual rule of setting a recency bit. That is, in the illustrated instance of FIG. 3, storage controller CXR1, for example, does not set the recency bits to 1 for the write groups WG5, WG6, WG7, WG8 and WG9 in list Q1 because all of the write groups are in a sequence. Likewise, storage controller CXR3 does not set the recency bits to 1 for the write groups WG6 and WG7 in list Q3 because these two write groups are in a sequence. This heuristic, which is reflected in lines 2-4 of the psuedo-code of Table One, gives the bulky sequential stripes 104 a smaller life and frees up space in caches WXR1 and WXR3 in the illustrated instance for a greater number of less populated stripes 104 that could potentially yield more hits.

Write Queue Depth

To utilize the full throughput potential of RAID array R1, R2, etc., it is crucial for storage controllers CXR1, CXR2, etc. to issue multiple concurrent writes. From the point of view of disk controller C1R1, for example, a destage operation from array controller CXR1 appears as a write request. This gives more choice to the scheduling algorithm of each disk controller C1R1, etc. (FIG. 2), which usually tries to maximize throughput without starving any I/Os. Furthermore, in RAID, the number of outstanding concurrent writes roughly dictates the number of disk D1R1, etc. heads that can be employed in parallel.

The number of outstanding concurrent writes for a storage controller CXR1, etc. at any given instant constitute a concurrent write queue (not shown). It should be understood that the concurrent write queue for controller CXR1 is the list Q1, or, more frequently, a subset of the list Q1. (As previously stated, it should be understood that list Q1, in actual practice, is typically much larger than the five write groups shown in the illustrative example of FIG. 3.) As the length of the concurrent write queue increases, both throughput and average write response time increases. Correspondingly, as the length of the concurrent write queue increases, reads suffer due to increased waiting for writes. According to an embodiment of the present invention, the concurrent write queue has maximum of MAXQUEUE concurrent write requests to the disks, where MAXQUEUE is twenty and a write request is a set of contiguous pages within one write group.

When to Destage

To address the issue of when to destage, which arises in line 19 of the processes set out in Table One, storage controllers such as controllers CXR1, CXR2, etc. dynamically vary the number of outstanding destages, i.e., concurrent write requests, responsive to space in their respective write caches WXR1, WXR2, etc. Specifically, storage controller CXR1, for example, initially sets a lowThreshold to 80% and a highThreshold to 90% of the size of its write cache, WXR1. If write cache WXR1 occupancy falls below the lowThreshold and storage controller CXR1 is not destaging a sequential write group, storage controller CXR1 stops all destages. However, if write cache WXR1 occupancy falls below the lowThreshold for a write group marked sequential, and if the next candidate destage is also marked sequential, then storage controller CXR1 continues destaging at a slow and steady rate of four outstanding destages at any time. This ensures that sequences are not broken and their spatial locality is exploited completely. Further, this also takes advantage of sequential bandwidth of disks D1R1, etc.

If write cache WXR1 occupancy is at or above the highThreshold, then storage controller CXR1 always destages at the maximum rate of MAXQUEUE concurrent write requests.

If write cache WXR1 occupancy is below the highThreshold and above the lowThreshold, storage controller CXR1 linearly varies the rate of destage from lowThreshold to highThreshold. That is, within this range between highThreshold and lowThreshold, storage controller CXR1 increases the number of outstanding concurrent writes responsive to decreasing space in the write cache WXR1.

Note that this linear variation in the rate of destaging will not always use the maximum queue depth MAXQUEUE. This is because writing at full throttle regardless of the rate of new writes is generally bad for performance. A steady rate of destage is more effective than a lot of destages at one time and very few at another. What is desired is simply to keep up with the incoming write load without filling up write cache WXR1. Dynamically ramping up the number of outstanding concurrent writes responsive to decreasing space in write cache WXR1 helps to achieve a steady rate.

As stated herein above, storage controller CXR1 initially sets lowThreshold to 80% and highThreshold to 90% of the size of write cache WXR1. However, because write response times can become quite large if write cache WXR1 ever becomes full, storage controller CXR1 also dynamically adjusts the level of highThreshold by incrementing and decrementing its value responsive to write cache occupancy. Storage controller CXR1 also adjusts lowThreshold responsive to the level of highThreshold. This adaptive back-off and advance arrangement attempts to avoid filling up write cache WXR1, while still attempting to maximize write cache WXR1 occupancy.

More specifically, storage controller CXR1 sets a desiredOccupancyLevel to 90% of the write cache WXR1 size and also maintains a certain maximum occupancy variable, maxOccupancyObserved, that indicates the maximum occupancy of write cache WXR1 since the last time the variable was reset. Responsive to the write cache WXR1 occupancy dropping below the current highThreshold, storage controller CXR1 decrements the highThreshold by any positive difference between maxOccupancyObserved and desiredOccupancyLevel and resets maxOccupancyObserved to the current occupancy level. Storage controller CXR1 also adjusts the lowThreshold to the level of highThreshold minus 10% of write cache WXR1 size. If, after a certain number of destages, maxOccupancyObserved is lower than desiredOccupancyLevel, then storage controller CXR1 increments highThreshold by the difference between desiredOccupancyLevel and maxOccupancyObserved, resets maxOccupancyObserved to the current occupancy level, and again adjusts the lowThreshold to the level of highThreshold minus 10% of write cache WXR1 size.

In one embodiment of the invention, the certain number of destages is equal to a certain reset interval variable, resetInterval, that storage controller CXR1 maintains. That is, storage controller CXR1 accumulates in the resetInterval variable a count of how many destage operations occur between two consecutive resettings of maxOccupancyObserved.

Although storage controller CXR1 increments and decrements the value of highThreshold as described herein above, it does not allow highThreshold to be higher than the desiredOccupancyLevel or lower than 10% of write cache WXR1 size.

Block Diagram of Typical Storage Controller

Figure 4:
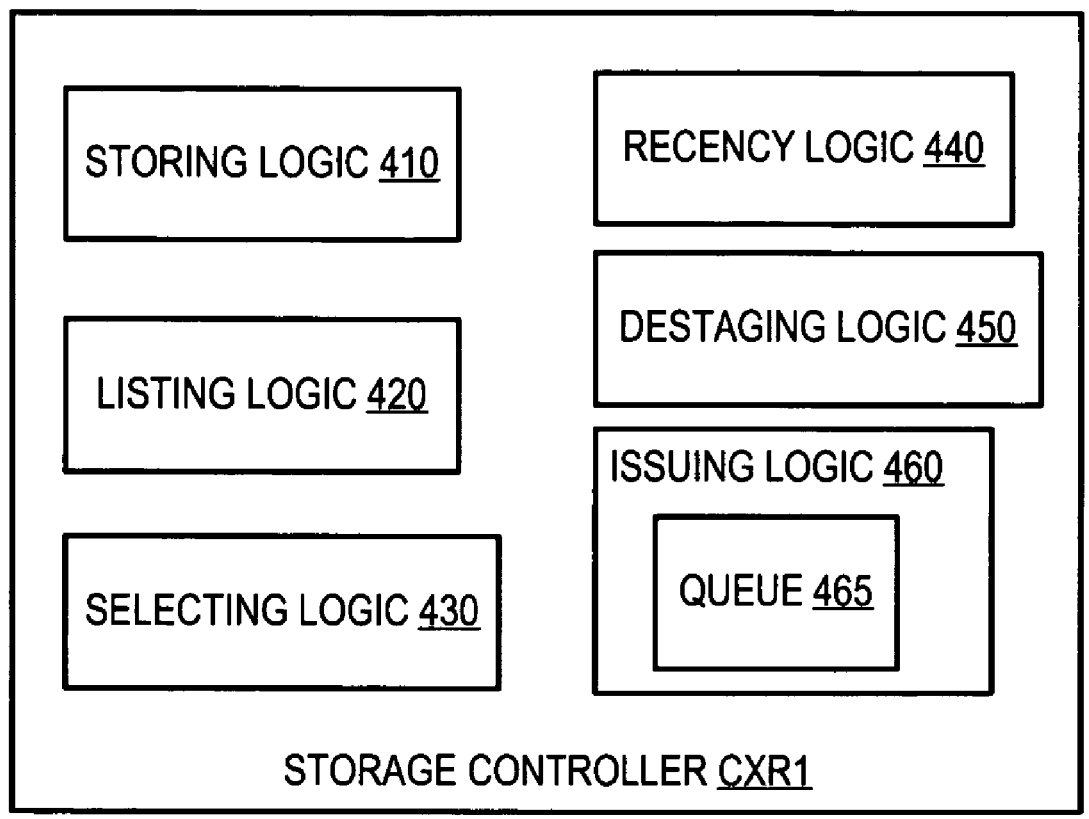
FIG. 4 illustrates certain additional details of one of the storage controllers of FIGS. 1-3, according to an embodiment of the present invention.

Referring now to FIG. 4, a block diagram of storage controller CXR1 of FIGS. 1-3 is shown, for an embodiment of the present invention. Storage controller CXR1 is typical also for storage controllers CXR2 and CXR3. Storage controller CXR1 includes storing logic 410 for performing the process of temporarily storing write groups in the write cache responsive to the write groups being written to the array, and listing logic 420 for performing the process of listing the write groups in the write cache in order of their sequence in the array. As previously described the listing is circular, so that a lowest one of the write groups is listed next to a highest one of the write groups. Storage controller CXR1 includes selecting logic 430 for performing the process of selecting the listed write groups, wherein the selecting rotates according to the sequence of the write groups. That is, selecting logic 430 advances a pointer from one listed write group to the next listed write group in the sequence. Storage controller CXR1 includes recency logic 440 for performing the process of setting recency bits for the listed write groups responsive to the respective write groups being written to, and for clearing the recency bits response to the respective write groups being selected. Storage controller CXR1 includes destaging logic 450 for destaging such a write group from the write cache to the disk responsive to selecting logic 430 selecting the listed write group, provided that the recency bit for the selected write group is clear. In one embodiment of the invention, such a clear recency bit may indicate that the selected write group has not been written to since storage controller CXR1 selected the write group in a previous rotation, or else that the selected write group has not been written to at least since it was placed in the write cache. In one embodiment of the invention, recency logic 440 also sets such a bit responsive to a write group being initially placed in the write cache, which eliminates destaging of the selected write group if it has not been written to merely since it was placed in the write cache but before it has been previously selected.

Controller CXR1 includes destaging write request issue logic 460, which includes a destaging write request queue 465. Issue logic 460 performs the process of issuing numerous, concurrent destaging write requests to ones of the disks, the number of which are varied responsive to space in the shared write cache. Issue logic 460 may vary the concurrent write requests by issuing concurrent destaging write requests at a certain predetermined maximum rate responsive to write cache space exceeding the certain high threshold. Issue logic 460 may also vary the concurrent write requests by increasing the number of concurrent destaging write requests responsive to decreasing space in the write cache if the write cache space is within a range between a certain high threshold and a certain low threshold. Issue logic 460 may also vary the concurrent write requests by issuing concurrent destaging write requests at a certain predetermined minimum rate responsive to write cache space falling below the low threshold for a write group that is a member of a sequence of write groups in the write cache, if a next listed write group for destaging is also a member of a sequence of write groups. Issue logic 460 may also vary the concurrent write requests by issuing no write requests responsive to the write cache space falling below the low threshold for a write group that is not a member of a sequence of write groups in the write cache.

General Remarks and Variations

WOW may be compared and contrasted to LRW or CLOCK, and CSCAN as follows. WOW destages in essentially the same order as CSCAN. However, WOW skips destaging of writes that are likely to be written to again, which is different than CSCAN. WOW generally will have a higher hit ratio than CSCAN at the cost of an increased gap between consecutive destages. WOW skips write groups that are likely to be written to again, by granting a new life to a write group responsive to a write hit until the destage pointer returns to it again, which is in a fashion like CLOCK. However, WOW inserts new write groups according to their sequential location in the disk array linear address space, rather than immediately behind the destage pointer as in CLOCK. Thus WOW does not always grant life to each newly inserted write group for one full rotation of the destage pointer as in CLOCK. WOW has a significantly smaller gap between consecutive destages than LRW at the cost of a generally lower hit ratio. In a system according to an embodiment of the present invention, it has been found that throughput increases for a wide variety of workloads as the size of the write cache increases.

Although it might superficially seem that it would, WOW does not strictly simulate disk head position for a number of reasons. First, concurrent read misses may be happening, which can take the disk heads to arbitrary locations on disks. Second, the position of the heads cannot be strictly controlled, for example, due to read-modify-write in RAID-5. And third, at a lower level, either the RAID array storage controller or the individual disk controllers may re-order concurrent write requests. WOW does tend to spatially localize disk heads to a relatively narrow region of the disks, so that resulting disk seeks are less expensive than would be random disk seeks which would tend to move the head across a larger number of cylinders on the disks.

In tests, WOW exhibited better or comparable peak throughput to the best of CSCAN and LRW across a wide gamut of write cache sizes and workload configurations. In addition, even at lower throughputs WOW had lower average response times than CSCAN and LRW. Also, both cache-insensitive and cache-sensitive regimes were explored as cache size was varied. This showed that CSCAN was good for cache-insensitive regimes, LRW was good for cache-insensitive regimes, and WOW was good across a range of cache sizes. In summary, WOW is a practical algorithm that fundamentally enhances the capacity of a storage controller to perform more I/Os.

The processes require simple data structures, including a sorted queue for storing write groups; a hash-based lookup for checking whether a write group is presented in the sorted queue, that is, for hit/miss determination; and a destage pointer for determining the next candidate write group for destage. The fact that sorting is an O(log(n)) algorithm does not present a practical problem due to the limited sizes of write cache and the cheap availability of computational power.

In addition to the embodiment of the invention described herein above, the invention has numerous other embodiments. Arising from a recognition that frequency is another feature of workloads indicating temporal locality, another embodiment of the invention uses counters as recency indicators for respective write groups instead of merely single recency bits. That is, for example, recency logic increments a recency counter for a listed write group each time the write group is written to, and decrements the recency counter each time the write group is selected. Destaging logic for destages the write group from the write cache to the disk responsive to selecting logic selecting the write group, provided that the recency counter for the selected write group is not larger than a certain predetermined minimum value.

In another variation, recency logic increments a recency counter for a listed write group according to the number of pages written to in the write group, such as by one count per page written to. The recency logic decrements the recency counter each time the write group is selected. Destaging logic for destages the write group from the write cache to the disk responsive to selecting logic selecting the write group, provided that the recency bit for the selected write group is not larger than a certain predetermined minimum value.

Herein above, an embodiment was described in which a storage controller overrides the usual rule of setting a recency bit in response to detecting that a number of write groups in an uninterrupted sequence are being added to the array storage controller write cache. In an alternative embodiment of the invention, instead of overriding the usual rule of setting a recency bit, if any one of a number of write groups in an uninterrupted sequence in the array storage controller write cache are selected by the sorted, circular list pointer for destaging, the storage controller destages all the write groups in the sequence, regardless of the states of their recency bits.

Herein above, a write cache was described as being nonvolatile. It should be understood that in other embodiments it is possible for the disk array write cache to be volatile, although this is not necessarily preferred. In various embodiments of the invention, the disk array may or may not include a read cache. A side benefit of maintaining a write cache is the read hits that it produces. The write caching processes of the present invention are not primarily intended to improve read hit ratio, since the read cache is larger and more effective in producing read hits. Nevertheless, in an embodiment of the present invention the storage controller checks the write cache for these not-so-numerous read hits and, for coherency, i.e., consistency, purposes, returns data from the write cache if there is a hit.

In an embodiment described herein above, a recency bit for a write group is set to zero upon insertion of the write group to the write cache. In another embodiment of the invention, the recency bit is set to 1 when the write group is initially inserted. This way, if the pointer happens to be almost to the newly inserted write group in its rotation when the write group is initially inserted, the write group will not be immediately destaged. That is, this variation eliminates destaging of the selected write group if it has not been written to merely since it was placed in the write cache, but before it has been previously selected, i.e., pointed at.

The description of the present embodiment has been presented for purposes of illustration, but is not intended to be exhaustive or to limit the invention to the form disclosed. Many modifications and variations will be apparent to those of ordinary skill in the art. For example, it should be understood that the one or more RAID storage controllers may be integrated in a computer system or may be external. Further, while the present invention has been described in the context of one or more RAID storage controllers implemented in hardware, which may include, for example application-specific integrated circuitry, those of ordinary skill in the art will appreciate that the logic of the storage controller described may be implemented by software processes. This is particularly the case since the present invention does not depend on any particular implementation of a RAID controller. Moreover, the processes of the present invention are capable of being distributed in the form of a computer readable storage medium of instructions. Such computer readable storage medium may have a variety of forms. The present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

Various embodiments implement the one or more software programs in various ways, including procedure-based techniques, component-based techniques, and/or object-oriented techniques, among others. Specific examples include XML, C, C++ objects, Java and commercial class libraries. Those of ordinary skill in the art will appreciate that the hardware depicted herein may vary depending on the implementation. For example, other peripheral devices may be used in addition to or in place of the hardware depicted in FIG. 3. The depicted example is not meant to imply architectural limitations with respect to the present invention.

The terms "logic" and "memory" are used herein. It should be understood that these terms refer to circuitry that is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

Herein above, and in the following claims, the term "comprises" is synonymous with "includes." The use of terminology such as "X comprises A, B and C" is not intended to imply that A, B and C are necessarily all of the components of X.

Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

What is claimed is:

1. A method of destaging a write cache in a storage system having an array of storage disks, the array being ordered in an sequence of write groups, wherein the write cache is shared by the disks, the method comprising the steps of:
   a) placing ones of the write groups in the write cache temporarily, responsive to the ones of the write groups being written to the array;
   b) listing the write groups stored in the write cache in order of the sequence in the array, wherein the listing is circular, so that a lowest one of the write groups is listed next to a highest one of the write groups;
   c) selecting the listed write groups in rotation according to the sequence; and
   d) destaging such a listed write group from the write cache to the disk responsive to i) the selecting of the write group and ii) a state of a recency indicator for the write group, wherein the recency indicator shows recency of writing to the write group.

2. The method of claim 1, wherein such a recency indicator includes a bit having one state indicating the write group has been written to recently and another state indicating the write group has not been written to recently.

3. The method of claim 2, wherein the method includes setting such a recency indicator for such a write group responsive to placing the write group in the write cache.

4. The method of claim 3, wherein the method includes clearing the state of such a recency indicator responsive to the selecting of the indicator's respective write group, and wherein the destaging of a write group responsive to the write group's recency indicator includes destaging responsive to the indicator being cleared.

5. The method of claim 1, wherein the destaging of such write groups includes issuing numerous, concurrent destaging write request to ones of the disks, and the method includes varying the concurrent write requests in number responsive to space in the shared write cache.

6. The method of claim 5, wherein varying the concurrent write requests includes issuing concurrent destaging write requests at a certain predetermined maximum rate responsive to write cache space exceeding the certain high threshold.

7. The method of claim 5, wherein varying the concurrent write requests includes increasing the number of concurrent destaging write requests responsive to decreasing space in the write cache if the write cache space is within a range between a certain high threshold and a certain low threshold.

8. The method of claim 5, wherein varying the concurrent write requests includes issuing concurrent destaging write requests at a certain predetermined minimum rate responsive to write cache space falling below the low threshold for a write group that is a member of a sequence of write groups in the write cache, if a next listed write group for destaging is also a member of a sequence of write groups.

9. The method of claim 5, wherein varying the concurrent destaging write requests includes issuing no write requests responsive to the write cache space falling below the low threshold for a write group that is not a member of a sequence of write groups in the write cache.

10. A computer program product for destaging a write cache in a storage system having an array of storage disks, the array being ordered in an sequence of write groups and the write cache being shared by the disks, wherein the computer program product resides on a computer readable storage medium having computer readable program code and the program code comprises:
   instructions for placing ones of the write groups in the write cache temporarily, responsive to the ones of the write groups being written to the array;
   instructions for listing the write groups stored in the write cache in order of the sequence in the array, wherein the listing is circular, so that a lowest one of the write groups is listed next to a highest one of the write groups;
   instructions for selecting the listed write groups in rotation according to the sequence; and
   instructions for destaging such a listed write group from the write cache to the disk responsive to i) the selecting of the write group and ii) a state of a recency indicator for the write group, wherein the recency indicator shows recency of writing to the write group.

11. The computer program product of claim 10, wherein such a recency indicator includes a bit having one state indicating the write group has been written to recently and another state indicating the write group has not been written to recently.

12. The computer program product of claim 11, wherein the program code includes instructions for setting such a recency indicator for such a write group responsive to placing the write group in the write cache.

13. The computer program product of claim 12, wherein the program code includes instructions for clearing the state of such a recency indicator responsive to the selecting of the indicator's respective write group, and wherein the instructions for destaging of a write group responsive to the write group's recency indicator include instructions for destaging responsive to the indicator being cleared.

14. The computer program product of claim 10, wherein the instructions for destaging of such write groups include instructions for issuing numerous, concurrent destaging write request to ones of the disks, and the program code includes instructions for varying the concurrent write requests in number responsive to space in the shared write cache.

15. The computer program product of claim 14, wherein the instructions for varying the concurrent write requests include instructions for issuing concurrent destaging write requests at a certain predetermined maximum rate responsive to write cache space exceeding the certain high threshold.

16. The computer program product of claim 14, wherein the instructions for varying the concurrent write requests include instructions for increasing the number of concurrent destaging write requests responsive to decreasing space in the write cache if the write cache space is within a range between a certain high threshold and a certain low threshold.

17. The computer program product of claim 14, wherein the instructions for varying the concurrent write requests include instructions for issuing concurrent destaging write requests at a certain predetermined minimum rate responsive to write cache space falling below the low threshold for a write group that is a member of a sequence of write groups in the write cache, if a next listed write group for destaging is also a member of a sequence of write groups.

18. The computer program product of claim 14, wherein the instructions for varying the concurrent destaging write requests include instructions for issuing no write requests responsive to the write cache space falling below the low threshold for a write group that is not a member of a sequence of write groups in the write cache.

19. A storage system comprising:
an array of storage disks, the array being ordered in an sequence of write groups;
a write cache shared by the disks;
a storage controller, wherein the storage controller includes:
storing logic for placing ones of the write groups in the write cache temporarily, responsive to the ones of the write groups being written to the array;
listing logic for listing the write groups stored in the write cache in order of the sequence in the array, wherein the listing is circular, so that a lowest one of the write groups is listed next to a highest one of the write groups;
selecting logic for selecting the listed write groups in rotation according to the sequence; and
destaging logic for destaging such a listed write group from the write cache to the disk responsive to i) the selecting of the write group and ii) a state of a recency indicator for the write group, wherein the recency indicator shows recency of writing to the write group.

20. The storage system of claim 19, wherein such a recency indicator includes a bit having one state indicating the write group has been written to recently and another state indicating the write group has not been written to recently.

21. The storage system of claim 20, including recency logic for setting such a recency indicator for such a write group responsive to placing the write group in the write cache.

22. The storage system of claim 21, wherein the recency logic includes logic for clearing the state of such a recency indicator responsive to the selecting of the indicator's respective write group, and wherein the destaging logic includes logic for destaging responsive to the indicator being cleared.

23. The storage system of claim 19, wherein the storage controller includes issuing logic for issuing numerous, concurrent destaging write request to ones of the disks, and the issuing logic includes logic for varying the concurrent write requests in number responsive to space in the shared write cache.

24. The storage system of claim 23, wherein the issuing logic includes logic for issuing concurrent destaging write requests at a certain predetermined maximum rate responsive to write cache space exceeding the certain high threshold.

25. The storage system of claim 23, wherein the issuing logic includes logic for increasing the number of concurrent destaging write requests responsive to decreasing space in the write cache if the write cache space is within a range between a certain high threshold and a certain low threshold.

26. The storage system of claim 23, wherein the issue logic includes logic for issuing concurrent destaging write requests at a certain predetermined minimum rate responsive to write cache space falling below the low threshold for a write group that is a member of a sequence of write groups in the write cache, if a next listed write group for destaging is also a member of a sequence of write groups.

27. The storage system of claim 23, wherein the issuing logic includes logic for halting the issuing of write requests responsive to the write cache space falling below the low threshold for a write group that is not a member of a sequence of write groups in the write cache.

* * * * *